United States Patent [19]
Taig

[11] Patent Number: 5,161,650
[45] Date of Patent: Nov. 10, 1992

[54] DISC BRAKE WITH POWERED INTEGRAL PARKING MECHANISM

[75] Inventor: Alistair G. Taig, Edwardsburg, Mich.

[73] Assignee: Allied-Signal Inc., Morristown, N.J.

[21] Appl. No.: 704,586

[22] Filed: May 22, 1991

[51] Int. Cl.⁵ .............................................. F16D 55/10
[52] U.S. Cl. .................................. 188/72.8; 188/71.9; 188/72.4; 303/10
[58] Field of Search .................. 188/71.1, 71.5, 71.7, 188/71.9, 72.1, 72.3, 72.4, 72.5, 72.7, 72.8, 106 P, 106 F, 106 R; 303/10, 11; 74/89.15, 89.17, 110, 422, 498; 92/136

[56] References Cited

U.S. PATENT DOCUMENTS

| | | | |
|---|---|---|---|
| 3,040,717 | 6/1962 | Rumsey | 74/89.17 |
| 3,444,784 | 5/1969 | Wengerd | 92/136 |
| 3,610,373 | 10/1971 | Burnett | 188/196 D |
| 3,647,031 | 3/1972 | Burnett | 188/106 F |
| 4,722,575 | 2/1988 | Graham | 303/10 |
| 4,841,844 | 6/1989 | Tootle | 74/89.15 |

FOREIGN PATENT DOCUMENTS

| | | | |
|---|---|---|---|
| 3019288 | 11/1981 | Fed. Rep. of Germany | 92/136 |
| 1228374 | 3/1960 | France | 74/89.17 |
| 1114684 | 5/1968 | United Kingdom | 188/106 F |

*Primary Examiner*—Robert J. Oberleitner
*Assistant Examiner*—Chris Schwartz

*Attorney, Agent, or Firm*—Larry J. Palguta; Ken C. Decker

[57] ABSTRACT

The disc brake (10, 106, 108, 206) with powered integral parking mechanism comprises a twin piston disc brake (106, 108, 206) having a screw member (22, 24; 122, 124; 222, 224) and nut (28, 29; 228, 229) adjuster mechanism. The twin pistons (16, 18; 216, 218) receive service braking hydraulic pressure to effect a service braking application, and also may be displaced mechanically for a parking application by way of the rack (80, 180) and pinion (47, 48; 247, 248) parking mechanism that is operated by hydraulic pressure. The rack (80, 180) and pinion (47, 48; 247, 248) parking mechanism may be located within the caliper housing (20, 220) such that the rack (80) extends between respective drive pinions (47, 48) located about the screw members (22, 24) in order to effect rotation of the screw members (22, 24) in opposite directions, or the rack (280) may extend longitudinally across the same side of both drive pinions (247, 248) to effect rotation of the drive pinions (247, 148) and associated screw members (222, 224) in the same direction of rotation. The drive pinions (47, 48; 247, 248) have ratchet teeth (49) which engage corresponding ratchet teeth (39) on screw member flanges (32, 34) such that during release the height (B) of a flange ratchet tooth (39) determines the running clearance of the disc brake pads.

46 Claims, 7 Drawing Sheets

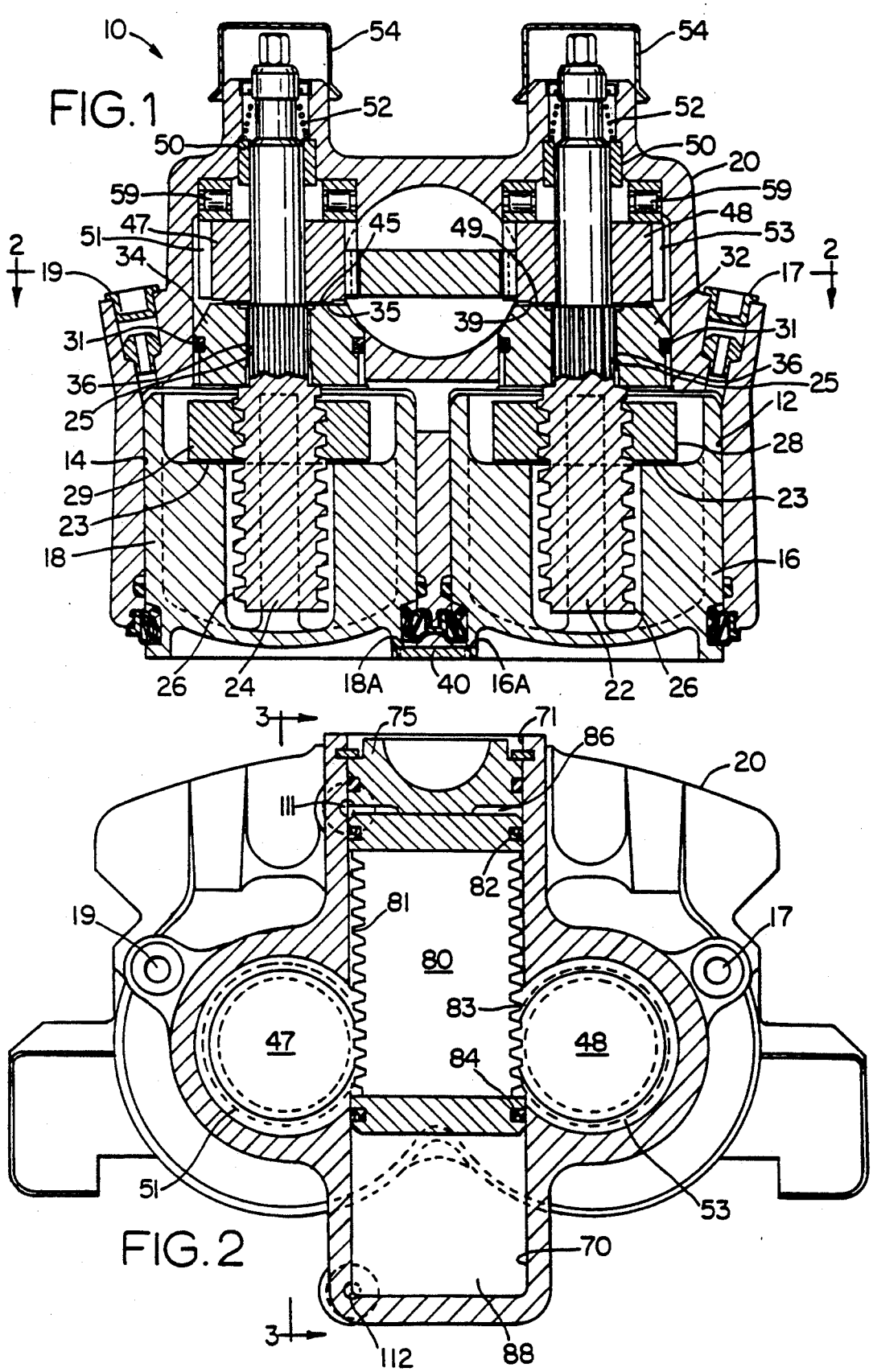

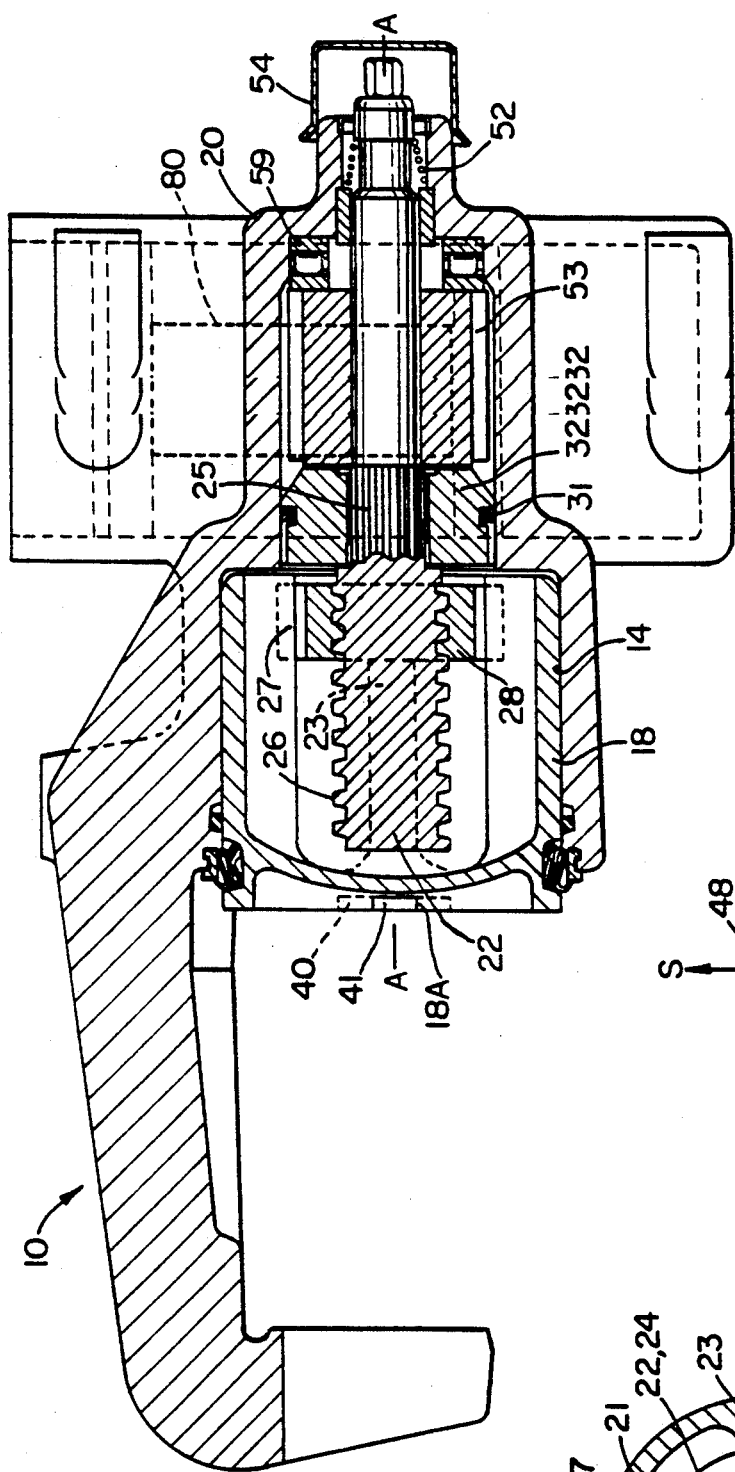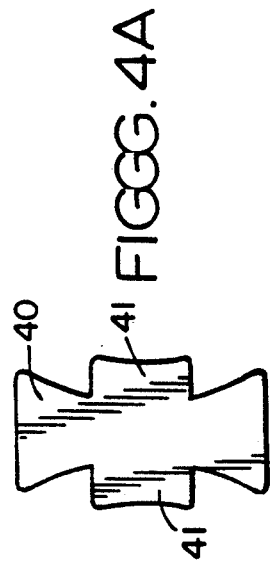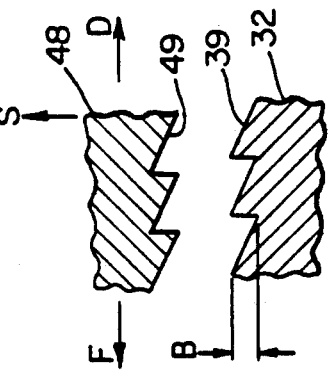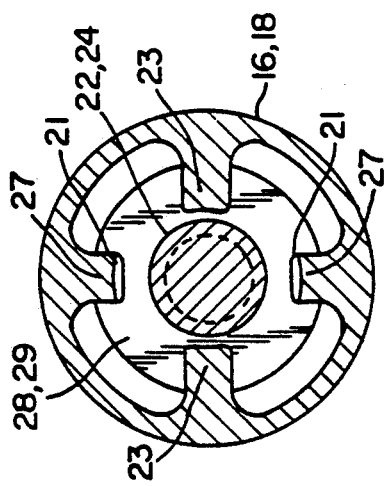

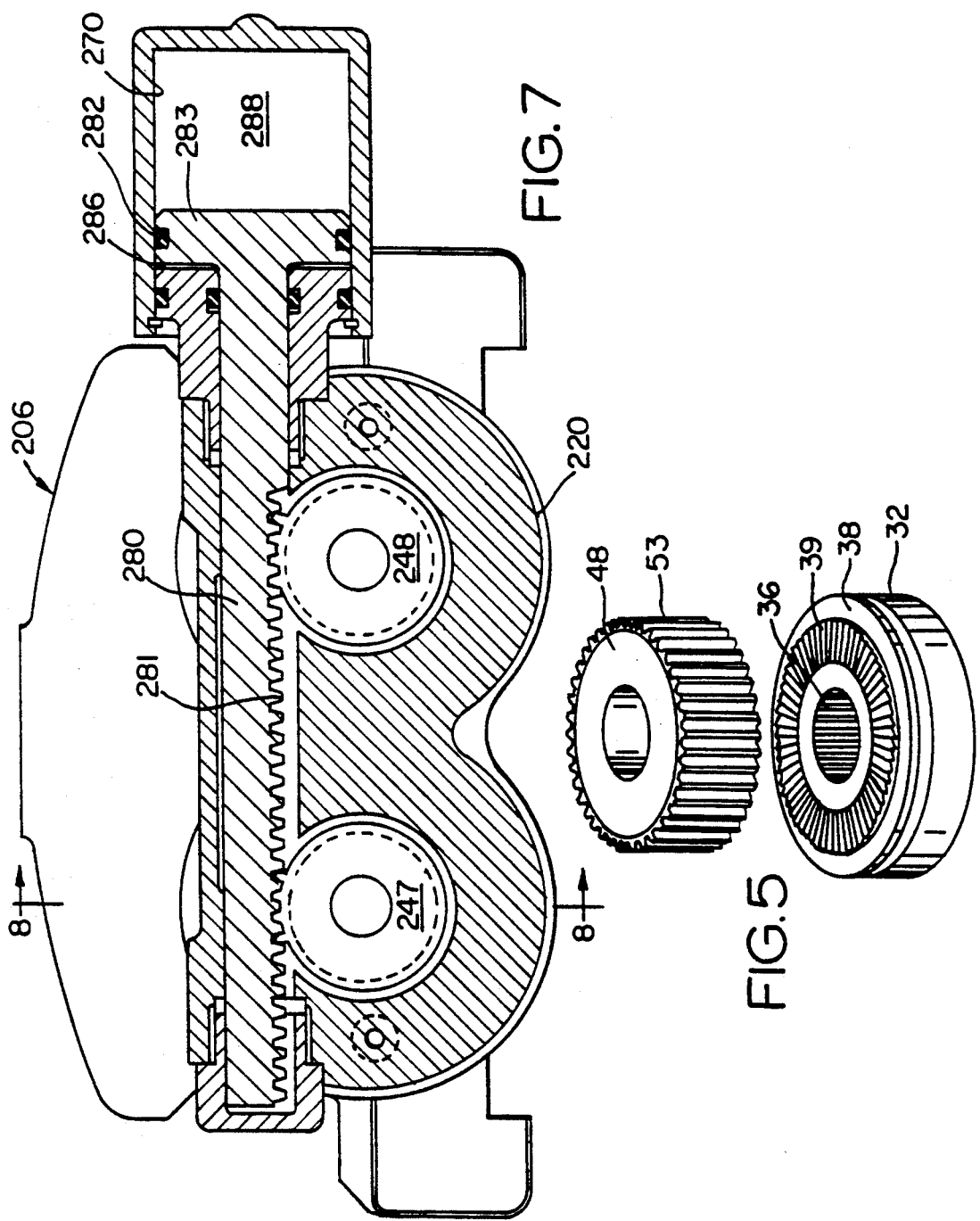

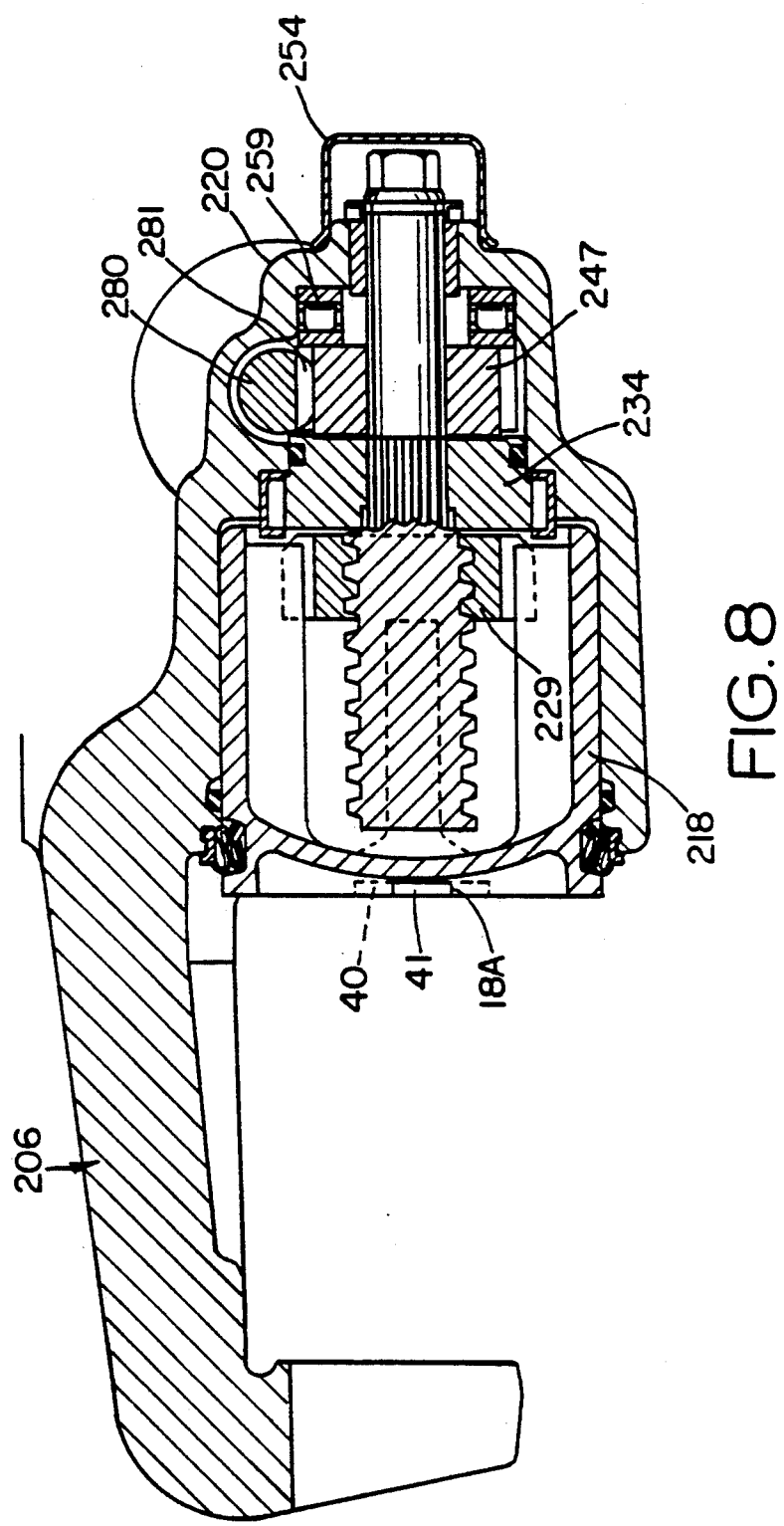

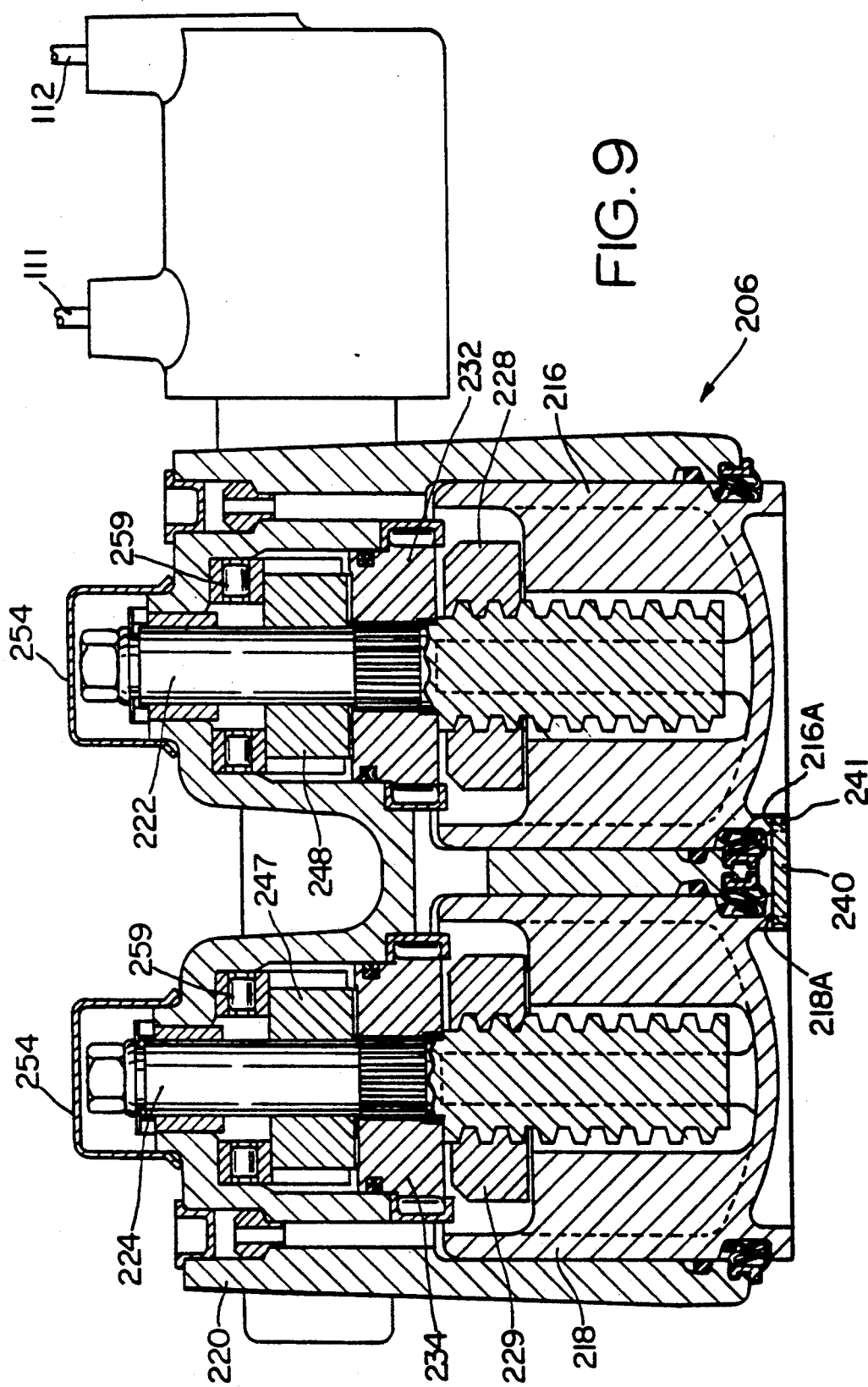

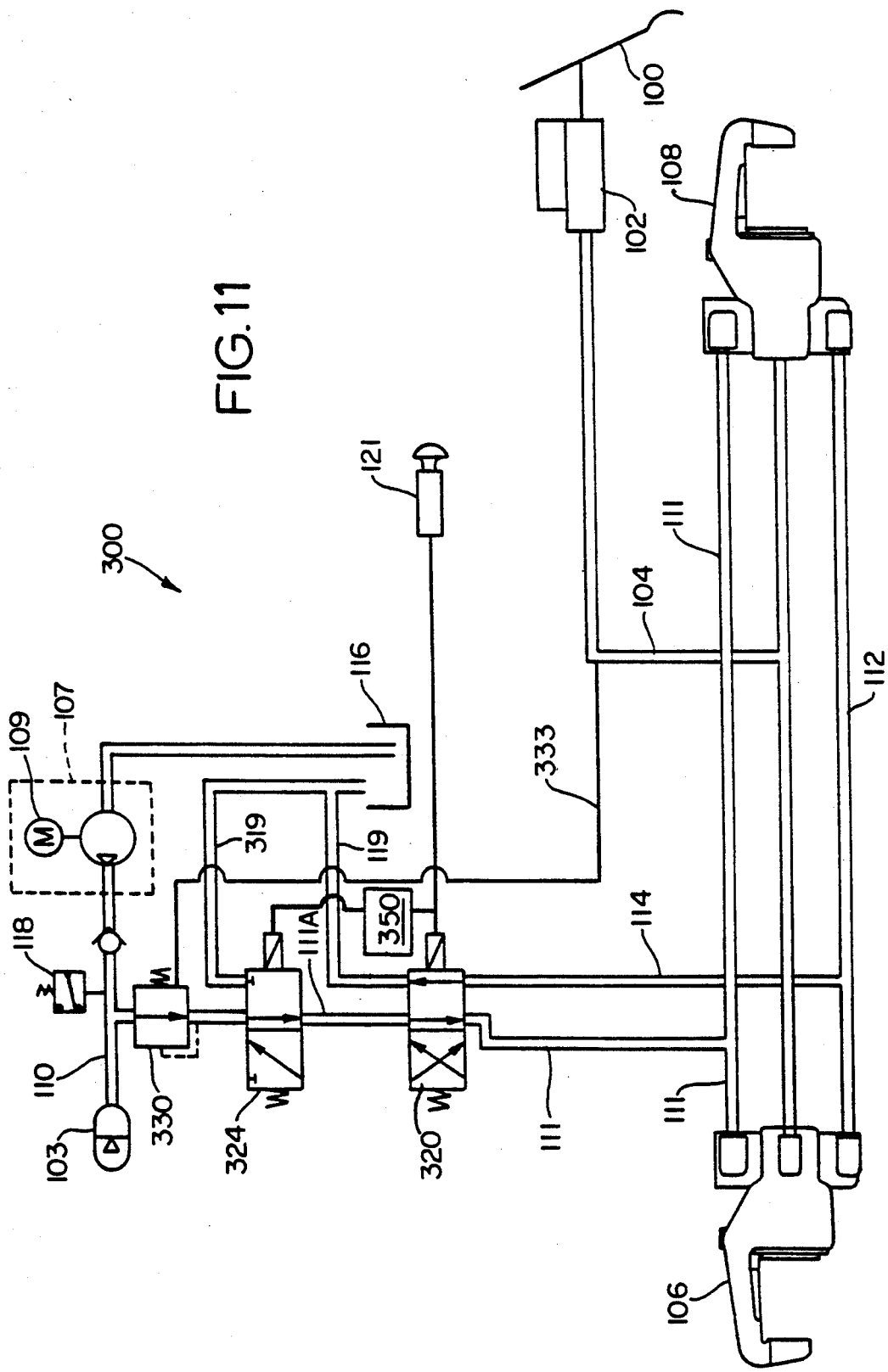

DISC BRAKE WITH POWERED INTEGRAL PARKING MECHANISM

The present invention relates generally to a disc brake, and in particular to a disc brake having a rack and pinion mechanism that operates the disc brake for a parking brake application.

A disc brake typically includes a hydraulically operated piston which displaces an associated brake pad against the face of the rotor which causes, by reaction, the caliper to move in an opposite direction and bring the other brake pad into engagement with the opposite face of the rotor. In order to effect an adjustment of the disc brake piston and compensate for brake pad lining wear, many designs have been proposed previously so that the piston is advanced gradually outwardly from the associated caliper bore to maintain the brake pads closely adjacent the rotor. Prior designs have proposed disc brake adjuster mechanisms which are operated by hydraulic pressure or springs, and which have a wide variety of components and designs in order to effect the adjustment operation. It is highly desirable to utilize the adjuster mechanism also for a parking application. Prior disc brake adjuster designs which utilize a screw and nut combination can also utilize the adjuster mechanism for a parking application. It is highly desirable to utilize as simple as possible an adjuster mechanism so that adjustment and parking applications are very reliable.

The present invention provides a unique combination of a rack and pinion mechanism used previously for the steering of a vehicle, in combination with a screw and nut mechanism in order to effect a parking application of the disc brake. The present invention comprises a disc brake having a powered parking mechanism, comprising a brake housing with a bore having a piston located therein, and a powered parking mechanism for effecting displacement of said piston for a parking application, the parking mechanism comprising a powered rack engaging a pinion, and means comprising a screw member rotatable by said pinion and having a nut disposed thereabout to be in engagement with said piston, such that displacement of said rack effects rotation of the pinion and operation of the screw member means so that the nut displaces the piston.

The invention is described in detail below with reference to the drawings which illustrate two embodiments in which:

FIG. 1 is a bottom section view of a twin bore disc brake including the present invention;

FIG. 2 is a section view taken along view line 2—2 of FIG. 1;

FIG. 3 is a section view taken along view line 3—3 of FIG. 2;

FIG. 4 is a view of the piston, nut, and screw;

FIG. 4A is a view of the locating key of the piston;

FIG. 5 is an isometric view of the drive pinion and screw member flange of the present invention;

FIG. 6 is an enlarged partial section view of the teeth of the drive pinion and screw member flange;

FIG. 7 is a section view of a second embodiment of the present invention;

FIG. 8 is a section view taken along view line 8—8 of FIG. 7;

FIG. 9 is a bottom section view of the disc brake of FIG. 8;

FIG. 11 is another brake circuit which includes disc brakes in accordance with the present invention.

Figure 10:
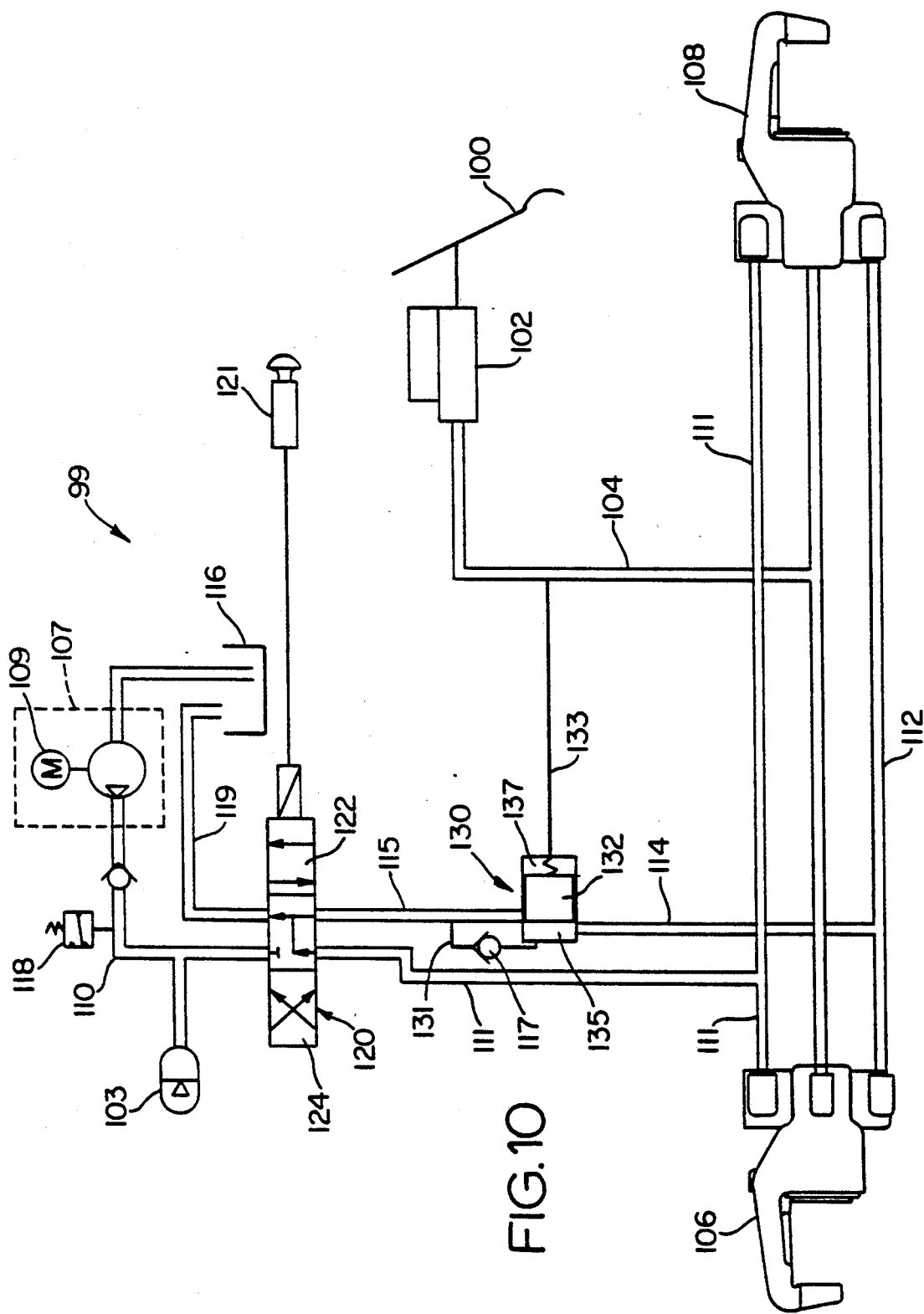
FIG. 10 is a brake circuit which includes disc brakes in accordance with the present invention.

In order to effect the parking of a disc braked vehicle by using the service disc brake calipers, it is necessary to use either all of the disc brakes for parking or to exert a clamp force on one pair of disc brakes that exceeds the clamp force available from the service brake system. If power assisted parking is necessary, as exists in medium to heavy trucks, one source of energy available might be a hydraulic accumulator which is kept charged by the service brake system or the power steering system, or any other source such as an anti-lock braking system. The accumulated pressure in the system would not normally be sufficient to enable the required parking force to be developed by direct application of the service disc brake pistons.

The present invention provides solutions to the above problems by providing a disc brake of the dual bore type which utilizes a separate hydraulic piston of a rack and pinion parking mechanism to turn a screw which applies thrust to a nut mounted in each service piston. Referring to FIG. 1, the disc brake of the present invention is designated generally by reference numeral 10. Disc brake 10 includes twin bores 12 and 14 each having respective pistons 16 and 18. Hydraulic pressure received at the openings temporarily enclosed by removable fittings 17 and 19 enables the vehicle operator to effect a service brake application of the pistons, as is well known in the art. Caliper or brake housing 20 also includes within stepped bores 12 and 14 a pair of screw members 22, 24. Each screw member includes at one end a thread 26 having a low helix angle relative to the thread of a respective nut 28, 29 such that the screw member and nut are irreversible once a parking brake application has been effected. Disposed about screw members 22 and 24 are screw member flanges 32, 34 which are coupled nonrotatably with the respective screw members by splines 36 that engage screw member splines 25. It should be clearly understood that screw member flanges 32 and 34 may comprise members separate from the respective screw members 22, 24, or may comprise flanges that are integral with the respective screw members. Each screw member flange can be made as an integral part of the respective screw member by utilizing standard cold heading technology for the forming of the screw member and flange. Screw member flange 32 is illustrated in FIG. 5 and includes ratchet teeth 39 located on radial face 38. Ratchet teeth 39 engage correspondingly shaped ratchet teeth 49 of drive pinion 48 (see FIGS. 5 and 6) so that rotation of drive pinion 48 in one direction will effect continuous rotation of screw member flange 32 and screw member 22 in the same direction of rotation. Each screw member 22, 24 is located within the respective stepped bore such that the end opposite the respective piston 16, 18 is journaled within bearing means 50 and biased by positioning spring 52. Screw members 22, 24 extend outwardly of the caliper housing and are covered by caps 54 to prevent the entry of contamination within the respective stepped bores. Each of the screw caps 54 can be removed so that the screw members 22, 24 can be manually operated and released during the replacement of brake pads of the disc brake, or if the hydraulic release system fails. Drive pinions 47, 48 each abut a respective set of thrust bearings 59. Drive pinion 47 includes circumferential teeth 51 and drive pinion 48 includes circumferential teeth 53 (see FIG. 5). The caliper housing includes transverse bore 70 (see FIG. 2)

located orthogonally relative to the longitudinal screw member axis A—A illustrated in FIG. 3. Bore 70 includes therein rack member 80 having teeth 81, 83 which engage with respective drive pinion teeth 51, 53. Rack member 80 comprises a piston having thereabout seals 82, 84, to define with bore 70 an application pressure chamber 86 and release pressure chamber 88. End 71 of bore 70 is sealed shut by closure member 75.

Pistons 16 and 18 are each coupled with a respective nut 28, 29 as illustrated in FIG. 4. Each piston includes two pairs of radially extending and axially offset webs 23 and 27. Webs 23 extend radially inwardly and are abutted by a radial face of the respective nut 28, 29 (see FIG. 1). Webs 27 extend radially inwardly to be received within nut recesses 21 so that each nut and piston are coupled nonrotatably together. Webs 27 are received within recesses 21 with a certain amount of "play" so that some misalignment between the pistons and nuts will prevent binding between the nuts and screws.

The pistons 16, 18 are oriented in the caliper 20 so that the webs 23 are located in the piston bores 12, 14 as shown in FIG. 1. FIGS. 1, 3 and 4A illustrate a locating key 40 which ensures initial piston alignment and nonrotation. Key 40 includes arms 41 which seat in piston slots 16A and 18A in order to prevent the pistons from rotating relative to one another during displacement by the respective nuts.

Referring now to FIG. 10, there is illustrated a novel brake circuit utilized with the disc brake of the present invention. Circuit 99 includes brake pedal 100 operating pressure application means or master cylinder 102 which is connected via line 104 with disc brakes 106 and 108 made in accordance with the present invention. Circuit 99 includes pump 107 operated by motor 109 in order to transmit pressure to accumulator 103 and through lines 110 and 111 to respective rack and pinion application pressure chambers 86 (see FIG. 2). Each release pressure chamber 88 is connected with release line 112 which communicates fluid pressure via lines 114, 115 and 119 to fluid reservoir 116. Motor pump 109 may be a motor pump utilized for the vehicle's power steering system, service brake system, or an adaptive braking system, and operable by pressure switch 118. Thus, it is necessary to ensure that the pump cannot communicate fluid pressure to the disc brakes when it is being utilized for a different function such as power steering. Lines 110 and 115 communicate with three-position solenoid valve 120 operable by parking switch 121. Solenoid valve 120 is shown in an "at rest" position wherein fluid pressure generated by pump 107 cannot be transmitted to disc brakes 106, 108, but fluid pressure returning from respective rack and pinion release pressure chambers 88 is free to communicate via lines 112, 114, 115 and 119 with reservoir 116. Solenoid valve 120 can be shifted by the parking switch so that connection 122 is implemented in order to apply fluid pressure for effecting a parking brake application, or to effect connection 124 to cause a release of fluid pressure and a termination of a parking brake application. Line 114 includes balancing valve or anticompounding valve 130 which includes spring biased piston 132 that receives fluid pressure from master cylinder 102 via pilot connection 133. An opposite side of piston 132 receives fluid pressure from line 114 at chamber 135. Chamber 135 is connected with line 115 according to the position of piston 132, and also via bypass check valve 117 in bypass line 131.

The disc brakes 106, 108 and braking circuit 99 in accordance with the present invention operate as follows in order to effect both service and parking brake applications. If the vehicle operator wishes to effect a service brake application, the operator depresses brake pedal 100 which operates master cylinder 102 that transmits hydraulic pressure via line 104 to disc brakes 106 and 108. Disc brakes 106, 108 (which correspond to disc brake 10) receive hydraulic fluid braking pressure at the openings previously covered by inlet fittings 17, 19 (see FIG. 1) so that the hydraulic pressure displaces pistons 16, 18 outwardly into engagement with a not shown inboard brake pad that moves against a not shown rotor. By reaction, the caliper or brake housing moves in the opposite direction to bring a not shown outboard brake pad into engagement with the opposite side of the rotor. Release of the brake pedal by the vehicle operator would terminate a service brake application.

If the vehicle operator wishes to effect a parking brake application, the vehicle operator would operate parking switch 121 which actuates solenoid valve 120 so that connection 122 is made operative and fluid pressure from accumulator 103 and/or operation of pump 107 is transmitted via lines 110, 111 to application pressure chambers 86 of the disc brakes. At the same time, hydraulic fluid within return pressure chambers 88 is permitted to flow through lines 112 and 114 to chamber 135 where it displaces spring biased piston 132 and communicates with lines 115, 119 and reservoir 116. The transmission of hydraulic fluid pressure to each application pressure chamber 86 causes each rack member 80 to move downwardly (see FIG. 2) and effect rotation of drive pinions 47, 48. Drive pinions 47 and 48 each include respective pinion ratchet teeth 45, 49 which engage the respective ratchet teeth 39, 35 of associated screw member flanges 32, 34 (see FIG. 1). Because drive pinions 47, 48 are rotated in opposite directions, the associated pinion ratchet teeth and corresponding ratchet teeth on the screw member flanges are right-handed and left-handed so that the resulting rotation of screw members 22, 24 will effect the appropriate displacement of the respective pistons. Referring to FIG. 6, the rotation of drive pinion 48 in the direction of arrow D causes through the engagement of ratchet teeth 49 with ratchet teeth 39 the rotation of screw member flange 32. As screw member flange 32 is rotated, screw member 22 coupled therewith also rotates and effects displacement of nut 28. Nut 28 is displaced along threads 26 and causes piston 16 to be displaced outwardly against the associated brake pad and the caliper to move by reaction. The same mode of operation occurs for drive pinion 47, screw member flange 34, screw member 24, nut 29 and piston 18. Because of the irreversible connection between the threads of the respective screw members and nuts, when the caliper has been applied for a parking brake application the brake will not release or back off unless circuit 99 is operated. When the vehicle operator wishes to release the parking brake mechanisms, parking switch 121 is operated to place in effect connection 124. Stored hydraulic pressure within line 110 is then transmitted via line 115 and/or line 131 to chamber 135, to line 114 and to the respective release pressure chambers 88 while application pressure chambers 86 are placed in communication with reservoir 116 via lines 111 and 119. Check valve 117 is disposed within bypass line 131 so that a release of parking brake mechanism stored fluid pressure (from accumulator 103 and/or operating pump 107) can be transmitted via line 110, valve 120, and line 115 to line 114 without any restriction by piston 132 of valve 130. As release pressure chambers 88 receive hydraulic fluid pressure and application pressure chambers 86 are communicated with reservoir 116, the respective rack members 80 translate upwardly toward the position illustrated in FIG. 2 to effect rotation of the drive pinions in opposite directions and effect a release of the brake pads from the rotors. As drive pinion 48 is rotated for a release of the parking brake application, the drive pinion is rotated in the direction of arrow F in FIG. 6 and this causes a corresponding rotation of the screw member flange 32 because the parking clamp force of the respective brake pad provides a reaction force that biases the respective nut, screw member and screw member flange against the drive pinion. However, as the parking clamp force is released, the drive pinion 48 gradually moves axially away from the screw member flange 32 in the direction of arrow S (FIG. 6) so that ratchet teeth 49 may slip or ratchet over corresponding ratchet teeth 39. Ratchet teeth 49 may eventually separate from ratchet teeth 39 of screw member flange 32. Thus, it is the height of each tooth as designated by dimension B which provides the running clearance of the disc brake, i.e. the clearance between the brake pads and the rotor. The nut will have been advanced along the respective screw member in accordance with brake pad lining wear, clamp force, and the running clearance, and during the release phase backed off an amount to release the clamp force and attain the running clearance, so that the nut and piston remain at an adjusted position relative to the screw member.

In order to prevent over adjustment of the parking brake mechanism in the event that the vehicle operator has his foot on brake pedal 100 to effect a service brake application while he is releasing the parking brake application, each screw member flange 32, 34 has seal 31 thereabout. Seal 31 engages the respective stepped bore so that service brake pressure received within the stepped bore is applied against both the respective piston and screw member flange to keep the ratchet teeth of the screw member flange engaged with the ratchet teeth of the respective drive pinion and result in the rotation of the screw member. Thus, the respective ratchet teeth of the drive pinions and screw member flanges are hydraulically loaded via the operator supplied service brake hydraulic pressure so that the drive pinions do not disengage prematurely from the respective screw member flanges.

Circuit 99 includes balancing or anticompounding valve 130 in release lines 114, 115 in order to limit the application of parking brake clamping force when service braking pressure is also being applied. This will prevent an over-application of both service hydraulic braking pressure and parking mechanism clamp load which could damage the disc brake. When the vehicle operator is applying a service brake application of hydraulic pressure during the actuation of the parking brake mechanism, the service brake pressure is transmitted from master cylinder 102 via pilot line 133 to chamber 137 of valve 130. This causes piston 132 to slide past the opening of line 115 and restrict the flow of fluid from release pressure chambers 88 toward reservoir 116. The result is that stored fluid pressure transmitted via lines 110, 111 to application pressure chambers 86 of the disc brakes will not displace associated rack members 80 until enough pressure is generated in release pressure chambers 88 and chamber 135 to cause piston 132 of valve 130 to be displaced past the opening of release line 115 and permit the fluid pressure of the release pressure chambers to be communicated with reservoir 116. This results in the service braking pressure effected by the vehicle operator via master cylinder 102 being subtracted from the parking brake application pressure being transmitted via lines 110 and 111. Thus, valve 130 prevents the compounding of the service brake application and parking brake application pressures which could cause damage to disc brakes 106, 108.

Because the parking brake mechanism acts equally over the brake pads of the disc brake, the brake is suitable as an emergency brake and does not promote premature caliper failure by imposing asymmetric loading. Also, the clamp or braking force available for a parking brake application is greater than a service brake clamp force, without requiring any greater hydraulic pressure. Because of the irreversible thread connection between the screw members and nuts, the parking brake may be applied and released by application of hydraulic pressure but does not require pressure to remain in either the park mode or release mode. Additionally, the parking brake mechanism can be applied or released when the service brake is malfunctioning, and as described above, over-adjustment and load compounding are prevented.

Referring to FIGS. 7-9, a second embodiment of the present invention is illustrated. The parking brake mechanism is essentially the same as disclosed above, except that the rack and pinion portion of the mechanism is located so that the drive pinions are both rotated in the same direction. An advantage of rotating drive pinions 247, 248 in the same direction of rotation is that there is no longer required right-handed and left-handed parts in order for screw members 222, 224 to advance pistons 216, 218 simultaneously in the same direction. Bore 270 includes release pressure chamber 288 and application pressure chamber 286, the chambers being divided by rack piston head 283 having seal 282 thereabout. Rack member 280 includes a single set of teeth 281 which engage drive pinions 247, 248. Except for rack member 280 being located above drive pinions 247, 248 in order to effect rotation thereof in the same direction, all other aspects of disc brake 206 is the same as disclosed above for disc brakes 10, 106 and 108.

Referring to FIG. 11, brake circuit 300 contains many of the same components and connections illustrated in brake circuit 99, and the identical components and connections are identified by the same numerals as in FIG. 10. As described above, pump 107 is connected via line 110 with accumulator 103, and with line 111 for communicating application pressure to brakes 106, 108. Release line 112 communicates with lines 114, 119 to transmit fluid to reservoir 116. Switch 121 is connected to a variable time delay 350 which delays the operation of a two-way solenoid valve 324. A second two-way solenoid valve 320 is connected directly with switch 121. Pilot connection 333 connects the output of pressure application means or master cylinder 102 with pressure reducing valve 330. For purposes of safety, two-way solenoid valves 320 and 324 are each spring biased into the illustrated failsafe pressure application mode. Thus, if there should be a failure in the electrical system of the vehicle, two-way solenoid valves 320 and 324 will cause the parking brakes to apply and brake the vehicle.

The operation of the brakes to effect a service brake application is the same as described above for FIG. 10.

When the vehicle is being driven, each of the solenoid valves 320, 324 are activated such that they are shuttled toward the right in FIG. 11 so that release line 114 communicates with line 111A which communicates with line 319 and reservoir 116. Line 110 containing fluid pressure is isolated from the brakes by the activated position of solenoid valve 324. Apply line 111 communicates via activated solenoid valve 320 with line 119 and reservoir 116. Variable delay timer means 350 is connected to each of the solenoid valves 320, 324 and may effect independently different time delays for the respective valves. When the vehicle operator wishes to effect a parking brake application, the vehicle operator would activate parking switch 121 which effects a temporary deactivation of each of solenoid valves 320 and 324 so that they shuttle to the positions illustrated in FIG. 11. This permits fluid pressure in line 110 to communicate via lines 111A and 111 with disc brakes 106 and 108, and apply the parking brake mechanisms as described above. Reducing valve 330 permits the transmission of only a predetermined amount of braking fluid pressure to pressure application lines 111A and 111. If the vehicle is running at the time the vehicle operator applies the parking brakes, then solenoid valve 324 may be reenergized and thus isolate the parking brakes from motor pump 109 and accumulator 103. If the vehicle operator shuts off the vehicle engine before or after applying the parking brakes, solenoid 324 would remain deenergized or be deenergized, respectively, and thereby reapply fluid pressure to apply line 111. Thus, the circuit can be configured so that the parking brakes cannot be released unless the vehicle engine is running. When the vehicle operator wishes to release dics brakes 106, 108 after having started the vehicle engine, the operator moves switch 121 to an inactive position which causes solenoid valve 320 to move to an activated position such that apply line 110 is communicated via deactivated solenoid valve 324 with supply line 111A and release line 114, while application line 111 communicates via activated solenoid valve 320 with release line 119 and reservoir 116. After an appropriate period for brakes 106, 108 to be fully released, variable delay timer 350 causes solenoid valve 324 to activate so that brakes 106, 108 are isolated from high pressure supply line 110.

Reducing valve 330 provides the same anticompounding function as valve 130 illustrated in FIG. 10. If the vehicle operator has brake pedal 100 applied so that pressure is being generated in master cylinder 102, this pressure is transmitted via pilot line 333 to reducing valve 330 so that any pressure transmitted via line 110 will be reduced accordingly and prevent damage to the disc brakes. Reducing valve 330 effectively subtracts the service braking pressure provided by the vehicle operator via master cylinder 102, from the parking brake application pressure being transmitted via lines 110, 111A, and 111.

We claim:

1. A disc brake having a powered parking mechanism, comprising a brake housing with a bore having a piston located therein, the brake housing able to receive fluid pressure within said bore in order to displace said piston against an associated brake pad for service braking, and a powered parking mechanism for effecting displacement of said piston for a parking application, the parking mechanism comprising a screw member having a radially extending screw member flange and threads at one end of the screw member, a nut disposed about said threads and engaging said piston, a drive pinion disposed about an opposite end of said screw member and having ratchet teeth on one face thereof, the screw member flange having on one face ratchet teeth which oppose said ratchet teeth of the drive pinion, and a rack member disposed within said housing and having teeth which engage said drive pinion, the rack member movable longitudinally in opposite directions by means of hydraulic pressure, so that hydraulic pressure received by the rack member displaces the rack member to effect rotation of the drive pinion and a corresponding rotation of the screw member flange and screw member by means of engagement between the ratchet teeth, the rotation of the screw member causing the nut to translate along the screw member and displace the piston against the brake pad to effect said parking application.

2. The disc brake in accordance with claim 1, wherein the threads of the screw member and nut are irreversible to prevent a counter rotation of the nut without rotation of the screw member.

3. The disc brake in accordance with claim 2, wherein rack member pressure chambers and the rack member are disposed orthogonally relative to a longitudinal axis of said disc brake.

4. The disc brake in accordance with claim 3, wherein the pressure chambers are located at opposite ends of the rack member.

5. The disc brake in accordance with claim 1, further comprising a second screw member, screw member flange, piston, nut, drive pinion, and bore, so that said rack member displaces each of said pistons for a parking application.

6. The disc brake in accordance with claim 5, wherein said rack member is disposed between said screw members and movement of the rack member causes the screw members to rotate in opposite directions.

7. The disc brake in accordance with claim 5, wherein the rack member is disposed so that teeth on one side of said rack member engage both drive pinions.

8. The disc brake in accordance with claim 5, wherein the rack member is located perpendicular to a longitudinal axis of said brake housing such that the teeth of the rack member engage the drive pinions and effect rotation thereof in the same direction.

9. The disc brake in accordance with claim 8, further comprising a brake circuit connected with said disc brake, the brake circuit comprising pressure application means for effecting a service brake application, valve means operable to effect a hydraulic application and release of the piston for a parking application, and means for generating fluid pressure for said parking application.

10. The disc brake and brake circuit in accordance with claim 9, wherein the circuit further comprises a balancing valve located between said valve means and said disc brake, the balancing valve also connected with said pressure generating means.

11. The disc brake and brake circuit in accordance with claim 9, wherein the circuit further includes a pressure reducing valve located between the fluid pressure generating means and said disc brake.

12. The disc brake and brake circuit in accordance with claim 9, wherein the valve means comprises a pair of two-position solenoid valves.

13. The disc brake in accordance with claim 1, wherein one end of the rack member contains means for sealing thereabout and is received within a housing which defines with the rack member two pressure chambers.

14. The disc brake in accordance with claim 1, wherein the piston includes an internal opening receiving said screw member and nut, and two pairs of radially extending webs extending within said internal opening.

15. The disc brake in accordance with claim 14, wherein one pair of webs is engaged by a radial surface of said nut and each web of the other pair of webs extends within a radial recess of the nut in order to prevent rotation thereof.

16. A disc brake having a powered braking mechanism that displaces a brake pad, comprising a brake housing with a bore having a piston located therein, and said powered braking mechanism for effecting displacement of said piston and brake pad for a braking application, the braking mechanism comprising a powered rack engaging a pinion, and means comprising screw member means rotatable by said pinion and having a nut disposed thereabout to be in engagement with said piston, such that displacement of said rack effects rotation of the pinion and operation of the screw member means so that the nut displaces the piston and brake pad to effect the braking application.

17. The disc brake in accordance with claim 16, wherein the rack is disposed orthogonally relative to a longitudinal axis of said disc brake.

18. The disc brake in accordance with claim 16, wherein the piston includes an internal opening receiving said nut, and two pairs of radially extending webs extending within said internal opening.

19. The disc brake in accordance with claim 18, wherein one pair of webs is engaged by a radial surface of said nut and each web of the other pair of webs extends within a radial recess of the nut in order to prevent rotation thereof.

20. The disc brake in accordance with claim 16, wherein the rack contains means for sealing thereabout and is received within a housing with defines with the rack two pressure chambers.

21. The disc brake in accordance with claim 16, further comprising second screw member means, a second piston, pinion and bore, so that said rack displaces each of the pistons for a braking application.

22. The disc brake in accordance with claim 21, wherein said rack is disposed between both of said screw member means and movement of the rack causes the respective screw member means to rotate in opposite directions.

23. The disc brake in accordance with claim 21, wherein the rack is disposed so that teeth at one side of said rack member engages both pinions.

24. The disc brake in accordance with claim 21, further comprising key means engaging both pistons in order to prevent rotation thereof.

25. The disc brake in accordance with claim 16, wherein the pinion has ratchet teeth on one face thereof and the screw member means has ratchet teeth on an opposing face thereof, engagement of the pinion and screw member means teeth effecting rotation of said screw member means and said displacement of the nut.

26. The disc brake in accordance with claim 25, wherein the ratchet teeth on said screw member means have a predetermined height which effects a running clearance for said disc brake.

27. The disc brake in accordance with claim 16, wherein the piston includes sealing means thereabout so that hydraulic pressure actuates the piston for a service brake application.

28. The disc brake in accordance with claim 16, wherein rack pressure chambers and the rack are disposed orthogonally relative to a longitudinal axis of said disc brake.

29. The disc brake in accordance with claim 28, wherein the pressure chambers are located at opposite ends of the rack.

30. A disc brake having a powered parking mechanism and in combination with a brake circuit, comprising a brake housing with a bore having a piston located therein, and the powered parking mechanism for effecting displacement of said piston for a parking application, the parking mechanism comprising a powered rack engaging a pinion, and means comprising a screw member means rotatable by said pinion and having a nut disposed thereabout to be in engagement with said piston, such that displacement of said rack effects rotation of the pinion and operation of the screw member means so that the nut displaces the piston, and, the brake circuit connected with said disc brake, the brake circuit comprising pressure application means for effecting a service brake application, valve means operable to effect a hydraulic pressure application and release of the said piston for a parking application, and means for generating fluid pressure for said parking application.

31. The disc brake and circuit in accordance with claim 30, wherein the circuit further comprises a balancing valve located between said valve means and said disc brake, the balancing valve also connected with said pressure application means.

32. The disc brake and circuit in accordance with claim 30, wherein the pressure application means comprises vehicle operator controlled means for transmitting brake pressure to said disc brake.

33. The disc brake and circuit in accordance with claim 30, wherein the circuit further includes a pressure reducing valve located between the fluid pressure generating means and said disc brake, the reducing valve communicating with the pressure application means.

34. A disc brake having a powered braking mechanism that displaces a brake pad, comprising a brake housing with a bore having located therein a piston comprising nut means and said powered braking mechanism for effecting displacement of said piston and brake pad for a braking application, said braking mechanism comprising a powered rack engaging a pinion, and means comprising screw member means rotatable by said pinion to effect displacement of said piston by way of said nut means, such that displacement of said rack effects rotation of the pinion and operation of the screw member means to displace the piston and brake pad and effect the braking application.

35. The disc brake in accordance with claim 34, wherein the rack is disposed orthogonally relative to a longitudinal axis of said disc brake.

36. The disc brake in accordance with claim 34, wherein the piston includes an internal opening receiving a nut located bout said screw member means, and two pairs of radially extending webs extending within said internal opening.

37. The disc brake in accordance with claim 34, wherein one pair of webs is engaged by a radial surface of said nut and each web of the other pair of webs extends within a radial recess of the nut in order to prevent rotation thereof.

38. The disc brake in accordance with claim 34, further comprising second screw member means, a second piston, pinion and bore, so that said rack displaces each of the pistons for a braking application.

39. The disc brake in accordance with claim 38, wherein said rack is disposed between both of said screw member means and movement of the rack causes the respective screw member means to rotate in opposite directions.

40. The disc brake in accordance with claim 38, wherein the rack is disposed so that teeth at one side of said rack member engages both pinions.

41. The disc brake in accordance with claim 34, wherein the pinion has ratchet teeth on one face thereof and the screw member means has ratchet teeth on an opposing face thereof, engagement of the pinion and screw member means teeth effecting rotation of said screw member means and said displacement of the piston.

42. The disc brake in accordance with claim 41, wherein the ratchet teeth on said screw member means have a predetermined height which effects a running clearance for said disc brake.

43. The disc brake in accordance with claim 34, wherein the piston includes sealing means thereabout so that hydraulic pressure actuates the piston for a service brake application.

44. The disc brake in accordance with claim 34, wherein rack pressure chambers and the rack are disposed orthogonally relative to a longitudinal axis of said disc brake.

45. The disc brake in accordance with claim 44, wherein the pressure chambers are located at opposite ends of the rack.

46. A disc brake having a powered braking mechanism and in combination with a brake circuit, comprising a brake housing with a bore having a piston located therein that displaces a brake pad, and said powered braking mechanism for effecting displacement of said piston and brake pad for a braking application, the braking mechanism comprising a powered rack engaging a pinion, and means comprising screw member means rotatable by said pinion to effect displacement of said piston, such that displacement of said rack effects rotation of the pinion and operation of the screw member means to displace the piston and brake pad and effect the braking application, and the brake circuit connected with said disc brake, the brake circuit comprising pressure application means for effecting a service brake application, valve means operable to effect a hydraulic pressure application and release of said piston for a parking application, and means for generating fluid pressure for said parking application.

* * * * *